United States Patent
Tanaka

(10) Patent No.: US 7,057,763 B2
(45) Date of Patent: Jun. 6, 2006

(54) MULTI-MODE PRINT DATA PROCESSING

(75) Inventor: Sadahiro Tanaka, Irvine, CA (US)

(73) Assignee: Canon Kabushiki Kaisha, Tokyo (JP)

( * ) Notice: Subject to any disclaimer, the term of this patent is extended or adjusted under 35 U.S.C. 154(b) by 963 days.

(21) Appl. No.: 10/012,345

(22) Filed: Dec. 12, 2001

(65) Prior Publication Data

US 2003/0107751 A1  Jun. 12, 2003

(51) Int. Cl.
  *G06F 15/00* (2006.01)
(52) U.S. Cl. .................. 358/1.2; 358/1.9; 358/1.15; 358/1.17; 712/25; 712/215
(58) Field of Classification Search ............. 358/1.2, 358/1.15, 1.17; 712/24, 215
See application file for complete search history.

(56) References Cited

U.S. PATENT DOCUMENTS

| | | | |
|---|---|---|---|
| 4,668,995 A * | 5/1987 | Chen et al. ............. 382/272 |
| 5,546,474 A * | 8/1996 | Zuniga ................ 382/176 |
| 5,956,468 A * | 9/1999 | Ancin .................. 358/1.9 |
| 5,970,224 A * | 10/1999 | Salgado et al. ........... 358/1.16 |
| 6,005,679 A * | 12/1999 | Haneda ................. 358/453 |
| 6,044,450 A | 3/2000 | Tsushima et al. .......... 712/24 |
| 6,411,401 B1 * | 6/2002 | Ebner et al. ............. 358/1.9 |
| 6,421,050 B1 * | 7/2002 | Ruml et al. ............. 345/426 |
| 6,678,072 B1 * | 1/2004 | Matsuoka et al. ........ 358/2.1 |
| 6,779,101 B1 * | 8/2004 | Berg et al. .............. 712/24 |
| 6,914,697 B1 * | 7/2005 | Hamura et al. ........... 358/1.17 |
| 2001/0038457 A1 * | 11/2001 | Moreau et al. ........... 358/1.2 |
| 2001/0043357 A1 * | 11/2001 | Owa et al. .............. 358/1.15 |
| 2002/0067502 A1 * | 6/2002 | Hansen ................. 358/1.15 |

* cited by examiner

*Primary Examiner*—Joseph R. Pokrzuwa
*Assistant Examiner*—Mark R. Milia
(74) *Attorney, Agent, or Firm*—Fitzpatrick, Cella, Harper & Scinto

(57) ABSTRACT

Executing a plurality of print jobs in a job queue by a computing architecture, each print job including at least one instruction for processing print data, including accessing one of the print jobs from the job queue, determining whether the accessed print job represents an image, selecting a high resolution mode in the case that the accessed print job represents an image, selecting a low resolution mode in the case that the accessed print job does not represent an image, and executing the accessed print job in accordance with the selected resolution mode.

19 Claims, 8 Drawing Sheets

MULTI-MODE PRINT DATA PROCESSING

BACKGROUND OF THE INVENTION

1. Field of the Invention

The invention concerns the management and control of print data processing in a computing architecture, for completing a plurality of jobs in a job queue. Specifically, the invention concerns the efficient use of the computing resources in an image processing computing architecture, by controlling the assignment of the plurality of print jobs that comprise a document to be printed.

INCORPORATION BY REFERENCE

U.S. patent application Ser. No. 10/012,407, entitled "VLIW Instruction Control", filed concurrently herewith on Dec. 12, 2001, is incorporated herein by reference.

2. Description of the Related Art

A conventional image processing system, such as a printer rasterization engine, typically processes a document to be printed by processing a plurality of smaller print jobs, where each print job represents a portion of the document, such as a single page. The printer rasterization engine may be operated in a computing architecture comprised of a single processor or in a computing architecture comprised of several processors. Regardless of the computing architecture, conventional printer rasterization engines have the capability to process a document to be printed in a high resolution mode or a low resolution mode, depending on the type of document to be printed. For example, if the document contains an image, the user of a conventional printer rasterization engine may select a high resolution mode for the printer rasterization engine to process the document, so that the image will have a more suitable representation when printed. If, on the other hand, the document contains only text, then the user may select a low resolution mode for the printer rasterization engine to process the document, so that the text will have a sufficient representation without wasting significant amounts of computing resources associated with high resolution processing.

Often, a document to be printed will be comprised of various components, such that selecting a single resolution for printer rasterization engine to process the entire document is not efficient or desirable. For example, a document may include a large number of pages comprised of only text, and only one page comprised of an image. If the user selects a high resolution mode in such an example, the printer rasterization engine will unnecessarily utilize large amounts of computing resources while processing the print jobs corresponding to pages of the document that contain only text. In addition, if the user selects a low resolution mode, the printer rasterization engine will process the one page containing the image in a low resolution mode, resulting in an unsuitable representation of the image when printed.

Conventional image processing systems, such as a printer rasterization engine, can also be implemented in a computing architecture having a plurality of processors. In this regard, a very long instruction word (VLIW) computing architecture is typically comprised of multiple computing functional units, wherein each computing functional unit may be a portion of one CPU which has been divided into separate functional units, or slots. In addition, each computing functional unit shares the same program counter, which tracks program sequence steps of the computing functional units. Such an architecture allows for the execution of multiple instructions simultaneously, in parallel, during each machine cycle. In this manner, the overall processing speed of a VLIW computing architecture can be increased over that of a single, undivided CPU architecture. The multiple instructions are organized for distribution to the multiple computing functional units in a sequence of very long instruction words (VLIW).

For example, if the VLIW computing architecture includes four computing functional units, then each VLIW will include four separate instructions, one for each computing functional unit. In this manner, each VLIW is formatted into a plurality of instruction fields (four in the above example) each of which contains an instruction for execution by a respective computing functional unit. A sequence of VLIWs therefore can represent a plurality of computing jobs for execution by the computing functional units, respectively. Each particular instruction field of the VLIWs contains a sequential instruction of one of the computing jobs for execution by a respective computing functional unit. Accordingly, each of the computing functional units in the VLIW architecture sequentially executes a respective computing job, wherein each computing job is comprised of a sequence of instructions. As discussed above with respect to a printer rasterization engine, a computing job is a print job corresponding to a portion, or page, of a document to be printed.

A VLIW computing architecture for a printer rasterization engine may contain equal numbers of integer processors and image processors, such as SIMDs. Such a VLIW computing architecture often includes a task manager that generates a sequence of VLIWs which, when executed, carries out the plurality of print jobs in the job queue that represent a document to be printed. The task manager obtains multiple print jobs from the job queue and then creates a sequence of VLIWs wherein each instruction field of the VLIWs contains an instruction from one of the print jobs. For example, in a four-slot VLIW architecture, a VLIW is comprised of four instruction fields, two of which correspond to the two image processors, and the other two of which correspond to the two integer processors. Depending on the type of document, such as a document with few images, the image processors in such an architecture may be unused during the time that the integer processors are busy processing the print jobs containing text.

Accordingly, the above-described VLIW architecture for a printer rasterization engine can result in the inefficient use of one or more of the computing functional units, depending on the balance of print jobs between image print jobs and integer print jobs. For example, if a user selects a low resolution processing mode in such an architecture, then the image processors may be unused a large amount of the time while the integer processors are busy processing the print jobs representing text pages, and the print jobs representing image pages will be processed in low resolution, thereby resulting in an unsuitable image representation. On the other hand, a document that is comprised of more pages of images than pages of text may result in the image processors taking longer to complete their corresponding image print jobs after the integer processors have already completed their integer print jobs. This can result in longer overall processing time for the printer rasterization engine to process the print jobs for the document to be printed.

SUMMARY OF THE INVENTION

The present invention addresses the foregoing problems by providing for the management and control of print data processing in a computing architecture to complete a plurality of jobs in a job queue by efficiently using the computing resources in the image processing computing architecture. Specifically, the resolution mode of each of the print jobs that comprise a document to be printed is automatically selected based on whether or not the print job contains an image. In addition, when the computing architecture includes a plurality of processors, such as a VLIW architecture, the resolution of each print job of a document can be controlled based on whether an image processor is available for high resolution processing. The invention also provides control in an image processing VLIW architecture to utilize unused image processors for executing integer print jobs, so as to reduce the overall processing time of the image processing system, such as a printer rasterization engine. Also, the invention provides for the use of predetermined VLIW job code sets to implement the aforementioned print job balancing and assignment in a VLIW architecture. This is because multi-processor systems can independently change the flow to each processor, but VLIW systems generally cannot independently change the flow to each processing unit because each processing unit shares the same program counter.

Accordingly, one aspect of the invention concerns the execution of a plurality of print jobs in a job queue by a computing architecture, each print job including at least one instruction for processing print data, including accessing one of the print jobs from the job queue, determining whether the accessed print job represents an image, selecting a high resolution mode in the case that the accessed print job represents an image, selecting a low resolution mode in the case that the accessed print job does not represent an image, and executing the accessed print job in accordance with the selected resolution mode.

Preferably, the high resolution mode is selected if the print job represents an image which is larger than a predetermined print size. In addition, the execution step preferably executes a high resolution version of the accessed print job if the high resolution mode is selected, and executes a low resolution version of the accessed print job if the low resolution mode is selected. The invention can also be practiced in a VLIW computing architecture comprised of multiple processors, so that the high resolution mode is selected if the print job contains an image and if at least one of the processors is free to accommodate the high resolution mode. The multiple processors preferably include an equal number of integer processors and an equal number of image processors, such as SIMD processors. The high resolution mode can also be selected if the print job contains an image and if the number of integer print jobs in the job queue is substantially greater than the number of image print jobs in the job queue.

By virtue of the foregoing, the efficiency of an image processing system, implemented in a single processor or a VLIW computing architecture, can be increased by automatically selecting the resolution mode of each of the print jobs that comprise a document to be printed based on whether or not the print job contains an image. In addition, when the computing architecture includes a plurality of processors, such as a VLIW architecture, available processors are utilized for high resolution processing or for execution of integer print jobs, so as to reduce the overall processing time of the image processing system.

According to another aspect, the invention concerns executing a plurality of print jobs in a job queue by a computing architecture having a plurality of processors including a number of image processors and a number of integer processors. The invention includes determining whether the remaining print jobs in the job queue include an image print job, and selecting a print job combination from a plurality of predetermined print job combinations, each predetermined print job combination containing a plurality of job codes, each job code representing one of the print jobs in the job queue for execution in one of the plurality of processors. The invention further includes executing, in each respectively corresponding processor, the print jobs represented by the job codes in the selected print job combination. In the case that the remaining print jobs include an image print job, the selected print job combination includes one job code for each image processor representing an image print job, and one job code for each integer processor representing an integer print job. In the case that the remaining print jobs do not include an image print job, the selected print job combination includes one job code for each integer processor and for each image processor representing an integer print job.

Preferably, the plurality of processors includes an equal number of integer processors and an equal number of image processors, such as SIMD processors. In addition, each job code preferably identifies a type of a print job in the job queue, such as a type of integer print job or a type of image print job. Preferably, when the number of remaining image print jobs are substantially greater than the number of remaining integer print jobs, two job codes are assigned to each image processor and each of the two job codes represents a low resolution version of a remaining image print job. A low resolution version of an image print job preferably executes in one-half the time of a normal resolution version of an image print job.

By virtue of the foregoing, the efficiency of an image processing system implemented in a VLIW computing architecture is increased by balancing the image print jobs and the integer print jobs among the plurality of processors, so that unused image processors are used to execute integer print jobs, thereby reducing the overall processing time to process all print jobs in the print queue. In addition, when the number of image print jobs is substantially greater than the number of integer print jobs, low resolution image print jobs are used to balance the processing load between the image processors and the integer processors.

Another aspect of the invention concerns executing a plurality of print jobs in a job queue by a computing architecture having a plurality of processors including a number of image processors and a number of integer processors. The invention includes determining whether the remaining print jobs in the job queue include at least one remaining image print job, and whether a number of remaining image print jobs is substantially greater than a number of remaining integer print jobs, and selecting a print job combination from a plurality of predetermined print job combinations, each predetermined print job combination containing a plurality of job codes, each job code representing one of the print jobs in the job queue for execution in one of the plurality of processors. The invention further includes executing, in each respectively corresponding processor, the print jobs represented by the job codes in the selected print job combination. In the case that the remaining print jobs include at least one remaining image print job and the number of remaining image print jobs is not substantially greater than the number of remaining integer print jobs, the selected print job combination includes one job code for each image processor representing an image print job, and one job code for each integer processor representing an integer print job. In the case that the remaining print jobs include a number of remaining image print jobs that is substantially greater than the number of remaining integer print jobs, the job codes in the selected print job combination include two job codes for each image processor and one job code for each integer processor, each of the two job codes for each image processor representing a low resolution version of one of the remaining image print jobs in the job queue. In the case that the remaining print jobs do not include an image print job, the selected print job combination includes one job code for each integer processor and for each image processor representing an integer print job.

Preferably, the plurality of processors includes an equal number of integer processors and an equal number of image processors, such as SIMD processors. In addition, each job code preferably identifies a type of a print job in the job queue, such as a type of integer print job or a type of image print job. Preferably, a low resolution version of an image print job executes in one-half the time of a normal resolution version of an image print job.

By virtue of the foregoing, the efficiency of an image processing system implemented in a VLIW computing architecture is increased by balancing the image print jobs and the integer print jobs among the plurality of processors, so that unused image processors are used to execute integer print jobs, thereby reducing the overall processing time to process all print jobs in the print queue. In addition, when the number of image print jobs is substantially greater than the number of integer print jobs, low resolution image print jobs are used to balance the processing load between the image processors and the integer processors.

This brief summary has been provided so that the nature of the invention may be understood quickly. A more complete understanding of the invention can be obtained by reference to the following detailed description of the preferred embodiment thereof in connection with the attached drawings.

DETAILED DESCRIPTION OF THE PREFERRED EMBODIMENTS

Figure 1:
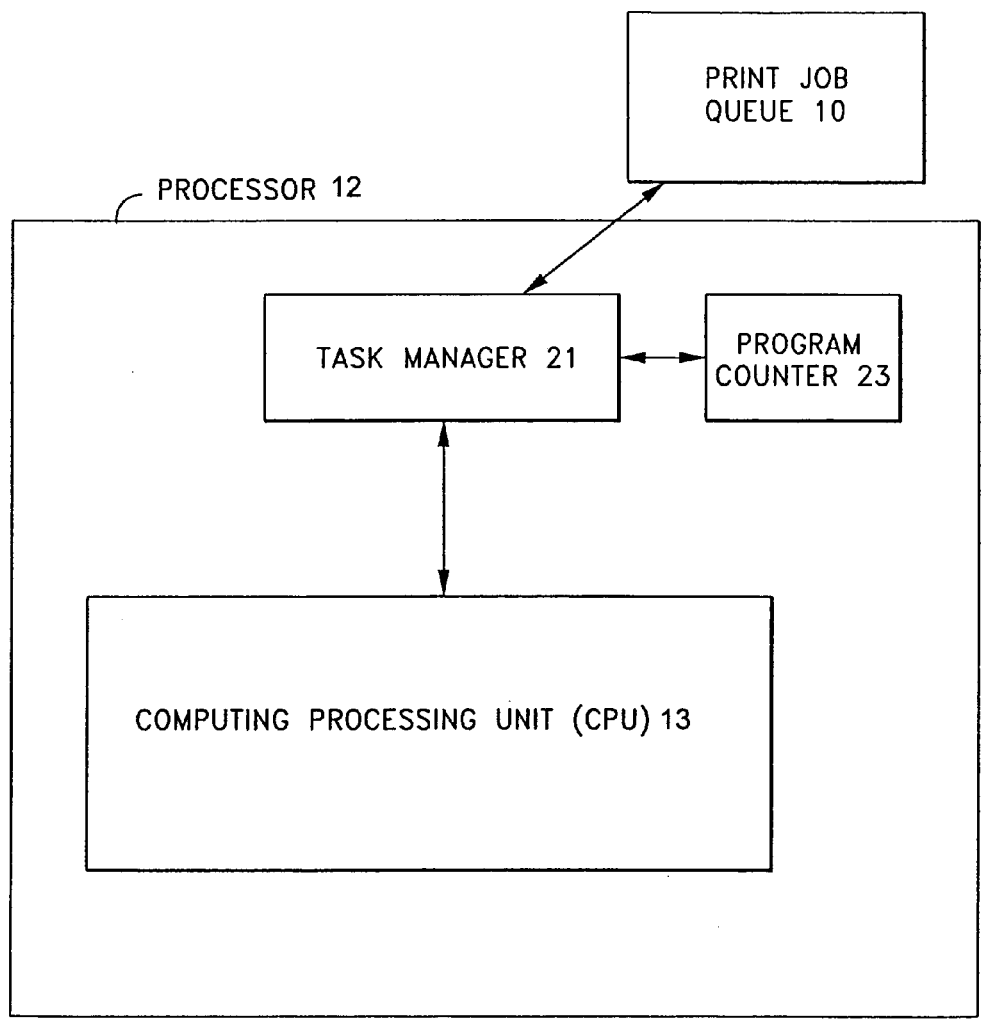
FIG. 1 is a block diagram which depicts one embodiment of a cental processor system in which the present invention may be practiced.
Figure 2:
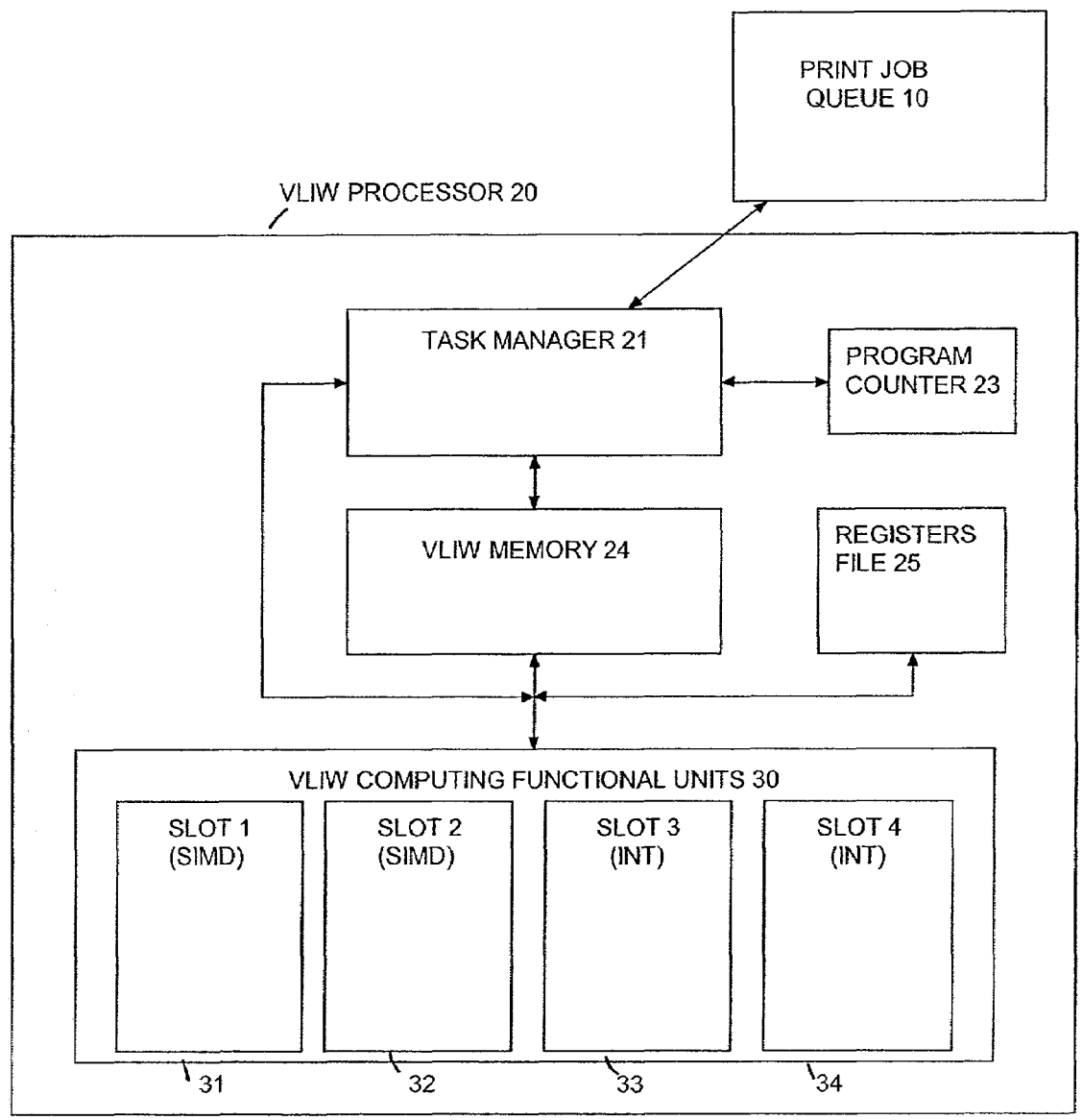
FIG. 2 is a block diagram which depicts one embodiment of a VLIW processor system in which the present invention may be practiced.

FIGS. 1 and 2 depict two different embodiments of processor systems in which the present invention may be practiced. FIG. 1 depicts a single processor system and FIG. 2 depicts a multi-processor VLIW system in which the present invention may be practiced, respectively.

Referring to FIG. 1, a single processor system is shown which is comprised of program job queue 10 and single processor 12. Program job queue 10 is a memory for storing a plurality of print jobs which together comprise one or more pages of a document to be rasterized (RIP'ed) for subsequent execution by a printing device to record a printed image. For example, the single processor system of FIG. 1 can be implemented in a printing device or in a computing device to process print jobs of a document. For example, a single document is divided into a plurality of print jobs, wherein each page of the document to be printed consists of a plurality of print jobs. The plurality of print jobs can be comprised of integer print jobs and image print jobs, each integer print job representing a section of text to be printed for the corresponding page of the document and each image print job representing an image to be printed for the corresponding page of the document. In this manner, a single page of a document can be comprised of many individual pages, each of which can contain, text only, images only, or a combination of the two.

Returning the FIG. 1, it can be seen that single processor 12 includes central processing unit (CPU) 13, task manager 21, and program counter 23. At the core of single processor 12 is CPU 13 which is utilized to execute each of the print jobs comprising each document page of the document to be printed. CPU 13 may be a commonly known processor, and is preferably capable of processing both integer print jobs and image print jobs. Task manager 21 monitors and manages the execution of print jobs by CPU 13. In particular, task manager 21 retrieves a selected plurality of print jobs from program job queue 10, each print job corresponding to a page of a document to be printed. Lastly, program counter 23 is used to track the address of the last print job of a page accessed by task manager 21 for execution by CPU 13. In this manner, program counter 23 allows task manager 21 to identify the next print job in print job queue 10 that should be accessed next for inclusion in the document page to be printed.

Referring to FIG. 2, a VLIW processor system is shown which is comprised of print job queue 10 and VLIW processor 20. Print job queue 10 is a memory for storing a plurality of print jobs which together comprise one or more pages of a document to be printed, as described above with respect to FIG. 1. Depending on the interrelationships between the individual print jobs comprising a document page, the print jobs may be executed in parallel or may be required to execute sequentially. For example, if one of the print jobs calculates the value of a variable which is used by the next print job, then the two print jobs must be executed sequentially. On the other hand, if the two print jobs do not have a sequential interdependency, then they can be executed in parallel. Accordingly, those print jobs that can be executed in parallel can be assigned to the various computing functional units of VLIW processor 20 for parallel execution in order to reduce the overall processing time of the single document page as compared with sequential execution of the print jobs in a single processor system, such as that of FIG. 1. Generally, the plurality of print jobs comprising a document page, such as image print jobs and/or integer print jobs, do not have interdependencies so that they can be easily executed in parallel.

Returning the FIG. 2, it can be seen VLIW processor 20 includes VLIW computing functional units 30, task manager 21, program counter 23, VLIW memory 24 and registers files 25. At the core of VLIW processor 20 is VLIW computing functional units 30, which is comprised of a plurality of computing functional units. In the embodiment illustrated in FIG. 2, there are four computing functional units in VLIW computing functional units 30. Of course, it can be appreciated that VLIW computing functional units 30 can be comprised of a different number of computing functional units, such as six, eight, ten, etc. In the embodiment depicted in FIG. 2, VLIW computing functional units 30 is comprised of computing functional units 31, 32, 33 and 34, which are also referred to as slots 1, 2, 3, and 4, respectively. Preferably, slots 1 and 2 are each a SIMD processor for image processing, such as an eight to twelve bit SIMD processor. Such image processing can include color balancing, filtering, and other known image processing functions. Slots 3 and 4 are preferably each a floating point integer processor for text and graphics processing, such as a thirty-two bit integer (INT) processor. Of course, slots 3 and 4 can also be comprised of a fixed point processor, or other type of processor. In addition, the combination of types of processors shown in FIG. 2 is only one example of a VLIW system for use in the present invention and it should be appreciated that other combinations and numbers of processors can comprise VLIW processor 20. Computing functional units 31 to 34 (slots 1 to 4) may also include load/store units to handle retrieval of data, and storing of data, to memory.

Task manager 21 monitors and manages the execution of instructions in VLIW computing functional units 30. In particular, task manager 21 retrieves a selected plurality of print jobs from print job queue 10, whereby each print job is assigned to an appropriate one of VLIW computing functional units 30 for execution. Task manager 21 then organizes the sequential instructions contained in the selected print jobs into a sequence of very long instruction words (VLIWs). Each VLIW is comprised of a plurality of instruction fields, each of which contains one of the sequential instructions, or a sub-instruction, from the corresponding print job. Each instruction field corresponds to one of VLIW computing functional units 30. In this manner, a VLIW contains sub-instructions for each of VLIW computing functional units 30 to be executed in parallel in a single machine cycle. The next VLIW in the VLIW sequence is accessed and executed by VLIW computing functional units 30 in the next machine cycle, and the process continues until all VLIWs in the VLIW sequence have been executed.

The sequence of VLIWs generated by task manager 21 is stored in VLIW memory 24 for access and execution by VLIW computing functional units 30, as described above. As seen in FIG. 2, the sub-instruction of each instruction filed in a VLIW is transferred to corresponding computing functional units 31 to 34 by means of a data bus between VLIW memory 24 and VLIW computing functional units 30. In addition, registers file 25 is provided as a memory for maintaining registers which are used by each of computing functional units 31 to 34 during their respective execution of the sub-instructions in the sequence of VLIWs.

Lastly, program counter 23 is used to track the address of the last print job of a document page to be accessed by task manager 21 for inclusion into a sequence of VLIWs. In this manner, program counter 23 allows task manager 21 to identify the next print job in print job queue 10 that should be accessed next for inclusion into the sequence of VLIWs. It should be appreciated that program counter 23 is shared for all of computing functional units 31 to 34, and therefore cannot be used to track the last address of the print job being executed by any particular one of computing functional units 31 to 34. For example, if computing functional unit 31 completes execution of a print job which has a jump instruction near the end, then task manager 21 cannot simply grab from print job queue 10 the print job starting with the "jump to" address. If task manager 21 were to do this, then program counter 23 would be advanced to the "jump to" address and could not be used to obtain the next appropriate print jobs for the other computing functional units. Instead, program counter 23 is only used to track the last address of the last print job accessed by task manager 21, regardless of which one of computing functional units 31 to 34 was utilized to execute the print job.

The VLIW processor system of FIG. 2 can therefore access a plurality of print jobs which comprise a single document page and assign the jobs to computing functional units 31 to 34, respectively through the use of the instruction fields in a generated sequence of VLIWs. The print jobs of the single document page can therefore be executed in parallel, thereby reducing the overall execution time of the document page in comparison to sequential execution by a single processor.

Figure 3A:
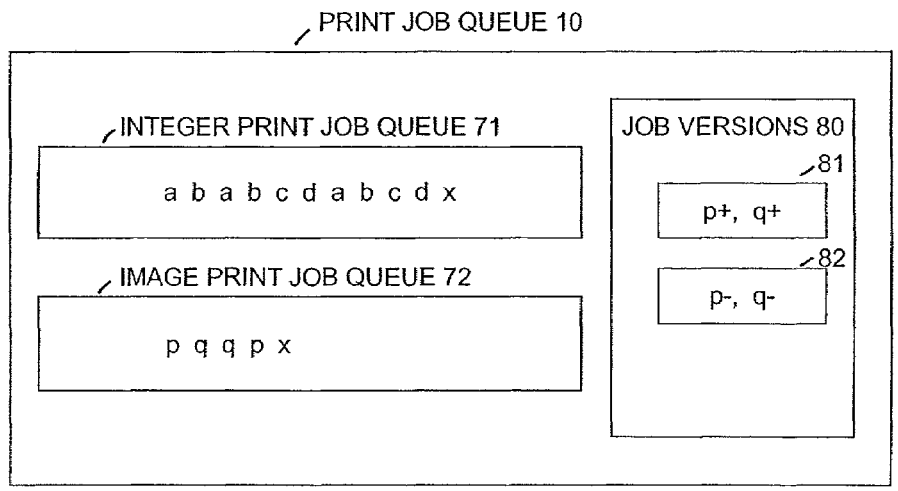
FIGS. 3A, 3B and 3C are block diagrams depicting the selection of a high resolution mode according to one aspect of the present invention.
Figure 3B:
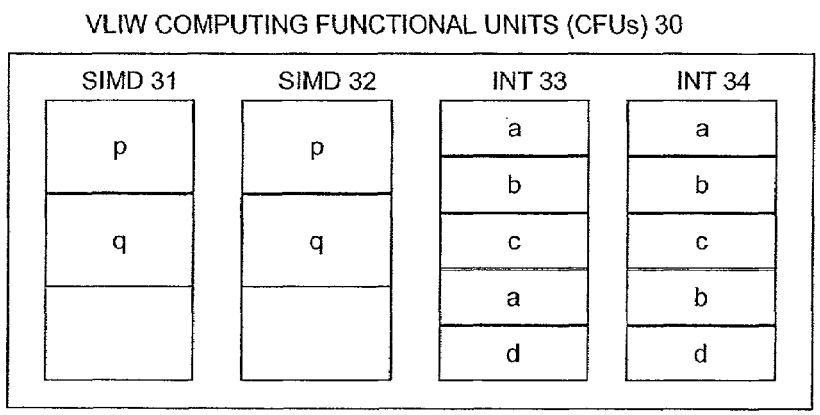
Figure 3C:
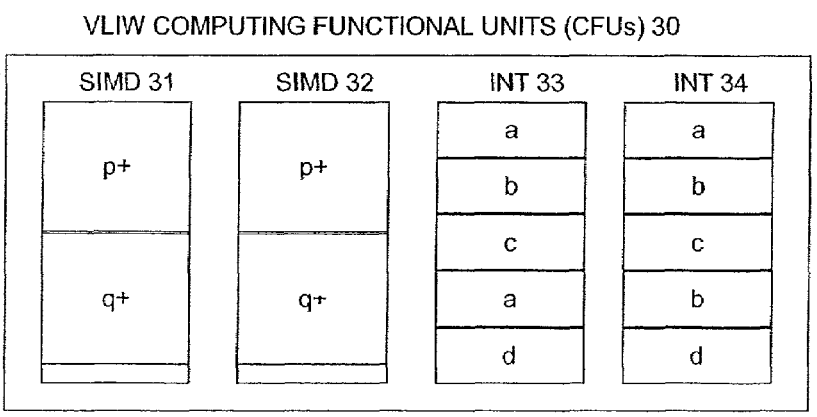

FIGS. 3A, 3B and 3C depict the implementation of one aspect of the present invention in which an appropriate resolution is automatically selected for image print jobs of a document page, based on the job balance between the image print jobs and the integer print jobs of the document page and the availability of unused machine cycles in the SIMD processors of VLIW computing functional units 30. In this manner, a high resolution mode is selected for processing image print jobs of a document page when it is possible to do so without substantially increasing the execution time of the document page. As seen in FIG. 3A, print job queue 10 contains integer print jobs 71 and image print jobs 72. For purposes of illustration, the jobs shown in integer print jobs 71 and image print jobs 72 are for a single document page of a document to be printed. Integer print jobs 71 contains ten integer print jobs of four different types identified by the letters "a", "b", "c" and "d". Similarly, image print jobs 72 contains four image print jobs of two different types identified by the letters "p" and "q". An end-of-page identifier "x" is placed at the end of the jobs in each of integer print jobs 71 and image print jobs 72. Accordingly, there are a total of fourteen print jobs in print job queue 10 which comprise a single document page.

Also included in print job queue 10 is job versions 80 which contains alternate versions of image print jobs "p" and "q". For example, job version 81 contains an enhanced, high-resolution version of each of image print jobs "P" and "q" which are identified as image print jobs "P+" and "q+", respectively. These high-resolution image print jobs process the images at a higher resolution for improved image quality over that of normal image processing. The high-resolution versions of the image print jobs generally take longer to execute than the normal-resolution versions of the image print jobs. Accordingly, the present invention determines when it is feasible to use the high-resolution image print jobs without substantially increasing the overall execution time for the print jobs of the document page. In a similar fashion, job version 82 contains an low-resolution version of each of image print jobs "P" and "q" which are identified as image print jobs "P−" and "q−", respectively. These low-resolution image print jobs process the images at a lower resolution for decreased image quality compared to that of normal image processing. The low-resolution versions of the image print jobs generally take less time to execute than the normal-resolution versions of the image print jobs. Accordingly, the present invention determines when it is feasible to use the low-resolution image print jobs in order to achieve a balance between the image print jobs and the integer print jobs, thereby decreasing the overall execution time for the print jobs of the document page.

Turning to FIG. 3B, VLIW computing functional units 30 is depicted in which the normal versions of image print jobs "p" and "q" are executed along with the integer print jobs of print job queue 10. Note that there are substantial unused machine cycles of SIMD computing functional units 31 and 32 after completion of the "p" and "q" image print jobs but prior to the completion of the integer print jobs in INT computing functional units 33 and 34. The present invention addresses this situation by detecting the presence of image print jobs in the document page depicted in print job queue 10, detecting an imbalance between the SIMD and INT computing functional units, and then utilizing an alternate resolution version of the image print jobs to take advantage of the imbalance. In this manner, FIGS. 3A to 3C depict the situation in which unused SIMD machine cycles are utilized by an increased resolution version of the image print jobs to achieve improved image quality without substantially increasing the overall execution time of the print jobs for the document page.

In FIG. 3C, it can be seen that image print jobs "p" and "q" have been replaced by enhanced, high-resolution versions "p+" and "q+" for execution in SIMDs 31 and 32. Note that the high-resolution versions take twice as long to execute as the normal resolution versions depicted in FIG. 3B. In this manner, SIMDs 31 and 32 finish execution of the image print jobs at approximately the same time as INTs 33 and 34 finish execution of their respective integer print jobs. The machine cycles of SIMDs 31 and 32 which would have otherwise been unused prior to completion of execution by INTs 33 and 34 are now utilized by the high-resolution versions "p+" and "q+" without increasing the overall execution time of all print jobs of the document page.

Figure 4A:
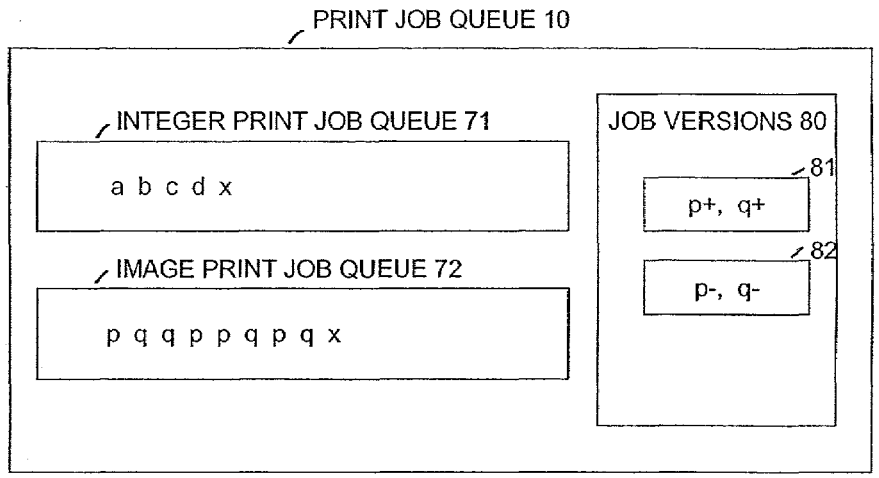
FIGS. 4A, 4B and 4C are block diagrams depicting the selection of a low resolution mode according to one aspect of the present invention.
Figure 4B:
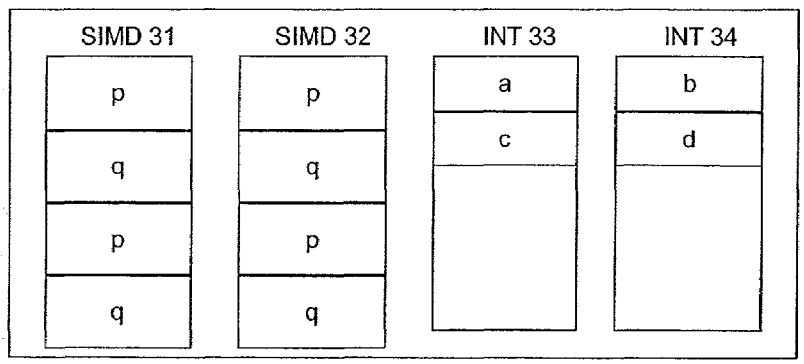
Figure 4C:
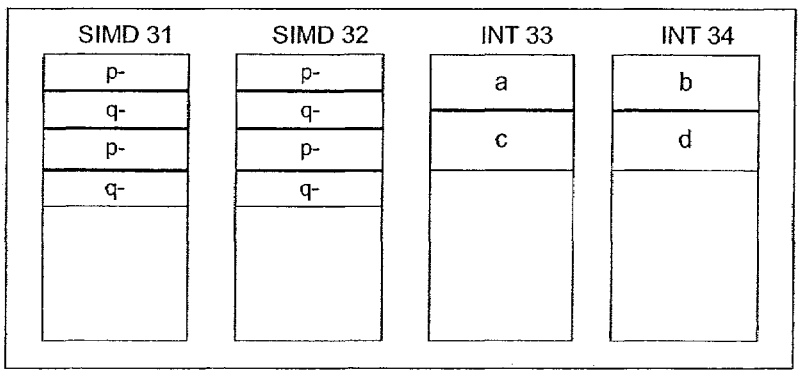

FIGS. 4A, 4B and 4C depict the implementation of one aspect of the present invention in which an appropriate resolution is automatically selected for image print jobs of a document page, based on the job balance between the image print jobs and the integer print jobs of the document page and the availability of unused machine cycles in the SIMD processors of VLIW computing functional units 30. In this manner, a low resolution mode is selected for processing image print jobs of a document page when it is appropriate to do so in order to balance the execution time between the image print jobs in SIMDs 31 and 32 and the integer print jobs in INTs 33 and 34. In this manner, each of VLIW computing functional units 30 completes execution at approximately the same time. As seen in FIG. 4A, integer print jobs 71 contains four integer print jobs of four different types identified by the letters "a", "b", "c" and "d".

Similarly, image print jobs 72 contains eight image print jobs of two different types identified by the letters "p" and "q". An end-of-page identifier "x" is placed at the end of the jobs in each of integer print jobs 71 and image print jobs 72. Accordingly, there are a total of twelve print jobs in print job queue 10 which comprise a single document page. In this respect, the job balance between integer print jobs and image print jobs is the opposite of that depicted in FIG. 3A. Also included in print job queue 10 is job versions 80 which contains alternate versions of image print jobs "p" and "q", as described above with respect to FIG. 3A.

Turning to FIG. 4B, VLIW computing functional units 30 is depicted in which the normal versions of image print jobs "p" and "q" are executed along with the integer print jobs of print job queue 10. Note that there are substantial unused machine cycles of INT computing functional units 33 and 34 after completion of the integer print jobs but prior to the completion of the image print jobs in SIMD computing functional units 31 and 32. The present invention addresses this situation by detecting the presence of image print jobs in the document page depicted in print job queue 10, detecting an imbalance between the SIMD and INT computing functional units, and then utilizing an alternate, low-resolution version of the image print jobs to achieve a greater balance between the execution times of the image print jobs and the integer print jobs. In this manner, FIGS. 4A to 4C depict the situation in which the image print jobs substantially outweigh the integer print jobs and therefore a low-resolution version of the image print jobs are utilized to achieve a balance in execution time of all print jobs among VLIW computing functional units 30. Of course, the image quality resulting from the low resolution image print jobs is not as great as that of the normal or high resolution print jobs. Accordingly, the automatic resolution feature of the present invention is preferably enabled and disabled by a user interface so that it is only used when the user does not absolutely require high resolution processing of all images in the document.

In FIG. 4C, it can be seen that image print jobs "p" and "q" have been replaced by enhanced, low-resolution versions "p−" and "q−" for execution in SIMDs 31 and 32. Note that the low-resolution versions take one-half as long to execute as the normal resolution versions depicted in FIG. 4B. In this manner, SIMDs 31 and 32 finish execution of the image print jobs at approximately the same time as INTs 33 and 34 finish execution of their respective integer print jobs. Accordingly, the overall execution time of all print jobs of the document page is reduced such that VLIW computing functional units 30 can execute another plurality of print jobs associated with the next document page.

Figure 5:
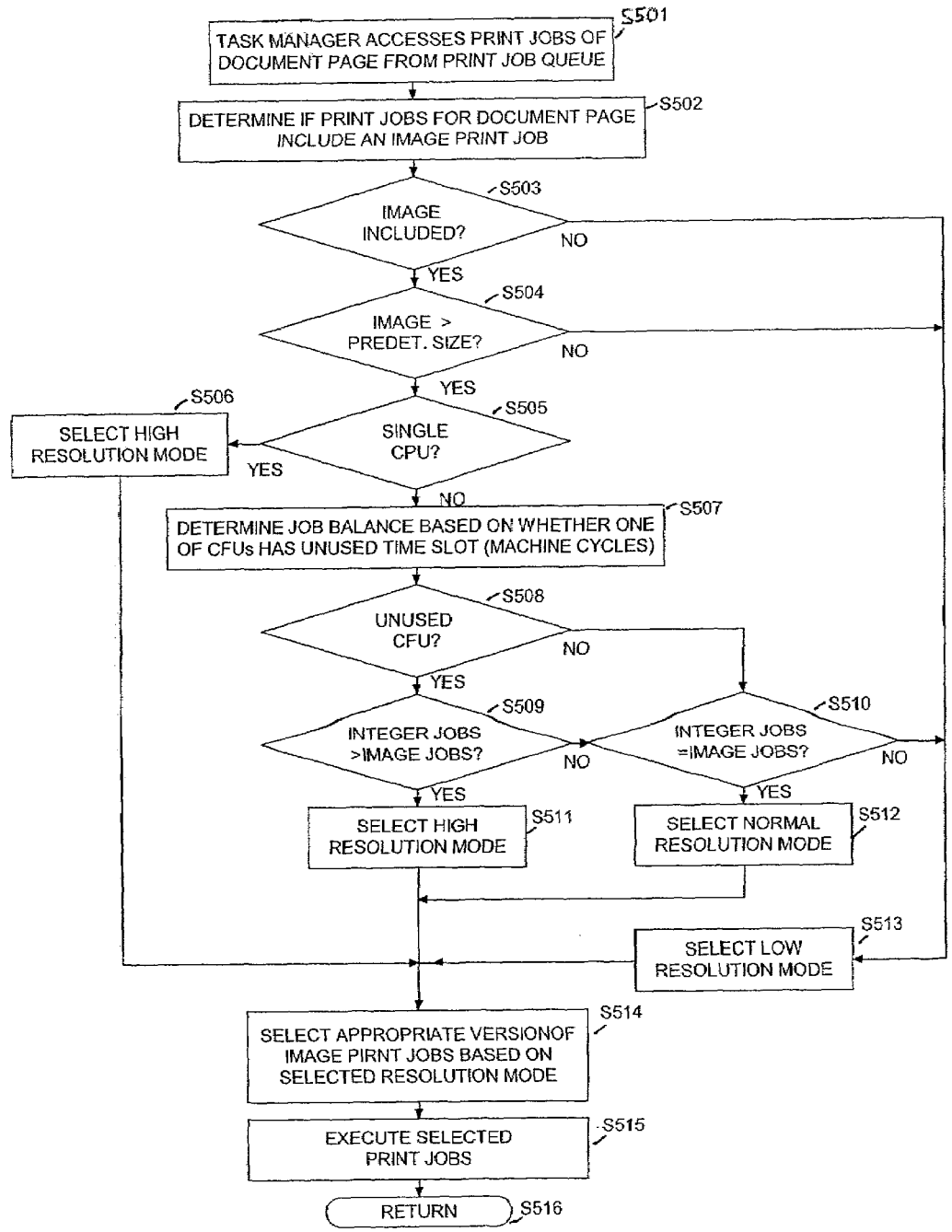
FIG. 5 is a flowchart which illustrates automatic resolution mode selection according to one aspect of the present invention.

FIG. 5 is a flowchart to explain the aspect of the present invention discussed above with respect to FIGS. 3A to 3C, and 4A to 4C. In step S501, task manager 21 accesses and selects from print job queue 10 the print jobs associated with the next document page. Task manager 21 next determines if the selected print jobs contain at least one image print job (step S502). In step S503, the flow is directed based on whether it is determined that the selected print jobs contain at least one image print job. If the selected print jobs contain at least one image print job, flow passes to step S504 in which it is determined whether the image print job is greater than a predetermined size. If the selected print jobs do not contain at least one image print job, flow passes to step S513 in which a low resolution mode is selected to process the image print jobs.

If it is determined in step S504 that the image print job is greater than a predetermined size, flow passes to step S505 in which it is determined whether the processor is a single-CPU processor or a VLIW processor. If a single-CPU is present, flow passes to step S506 in which a high resolution mode is selected to process the image print jobs, and then flow passes to step S514. If a single-CPU is not present, flow passes to step S507 in which the job balance is determined between the image print jobs and the integer print jobs based on whether at least one of VLIW computing functional units 30 will have unused machine cycles before all other computing functional units are finished executing their respective jobs. Flow the passes to step S508. If it is determined in step S504 that the image print job is not greater than a predetermined size, flow passes to step S513 in which a low resolution mode is selected to process the image print jobs.

In step S508, it is determined if one of the computing functional units has unused machine cycles. If so, flow passes to step S509. If not, flow passes to step S510. In step S509, it is determined if the integer print jobs substantially outnumber the image print jobs for the given document page. If so flow passes to step S511. If not, flow passes to step S510. In step S510, it is determined if the integer print jobs substantially equals the image print jobs for the given document page. If so, flow passes to step S512 in which a normal resolution mode is selected for processing of the image print jobs. If not, flow passes to step S513 in which a low resolution mode is selected for processing of the image print jobs. In step S511, a high resolution mode is selected for processing of the image print jobs.

As seen in FIG. 5, flow can pass from any one of steps S506, S511, S512, and S513 to step S514 in which an appropriate version of image print job is selected for each of the image print jobs in the document page being processed. For example, if a low resolution mode has been set, then low resolution image print jobs "p−" and "q−" will be utilized in place of image print jobs "p" and "q". Similarly, if a high resolution mode has been set, then high resolution image print jobs "p+" and "q+" will be utilized in place of image print jobs "p" and "q". Otherwise, normal resolution image print jobs "p" and "q" are utilized.

In step S515, all selected print jobs for the document page being processed are executed. In the case of a single processor, as in FIG. 1, the print jobs are executed sequentially. In the case of a VLIW processor, as in FIG. 2, the print jobs are implement in a VLIW sequence and executed by VLIW computing functional units 30. Flow then passes to return in step S516.

Figure 6:
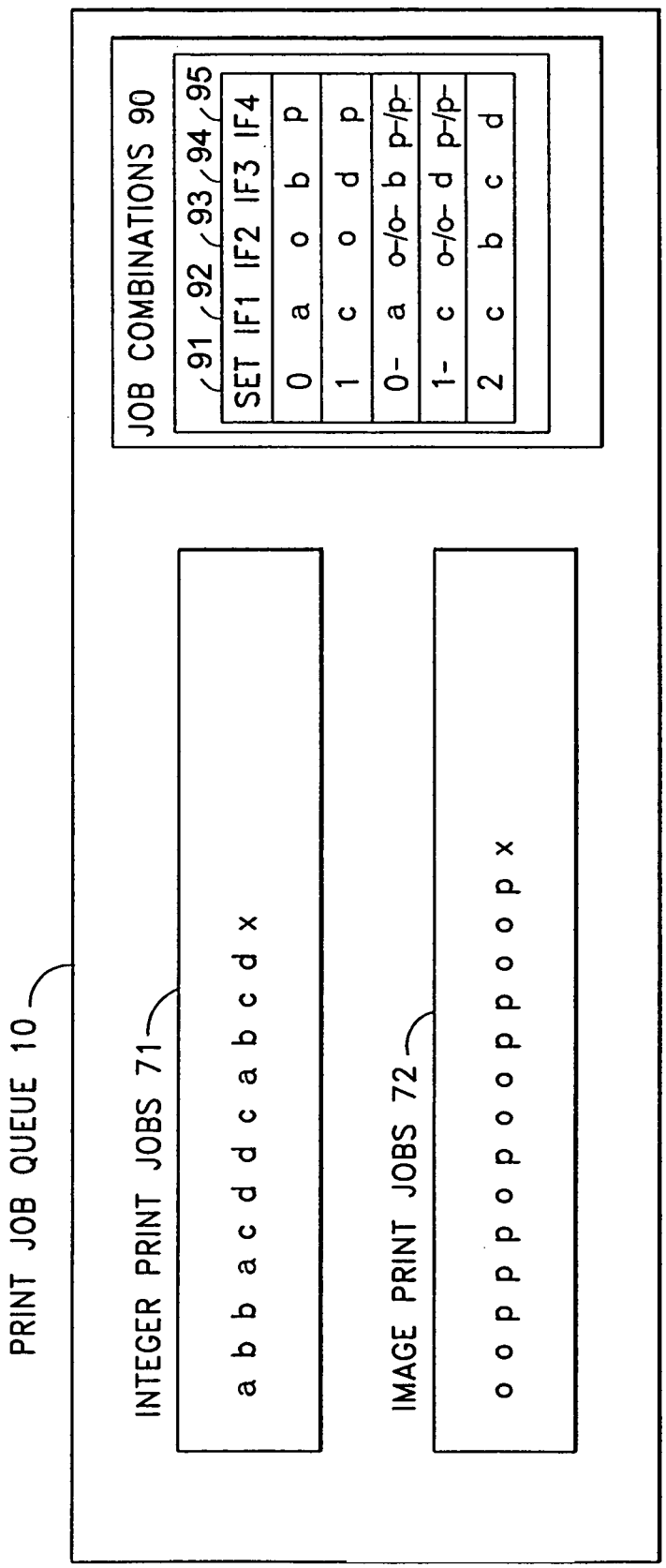
FIG. 6 is a block diagram which depicts a print job queue according to another aspect of the present invention.

FIG. 6 illustrates an aspect of the invention for use with a VLIW processor in which predetermined job combinations are utilized in order to optimally utilize each of VLIW computing functional units 30 depending on the balance between the image print jobs and the integer print jobs in a given document page. FIG. 6 shows print job queue 10 according to this aspect of the invention, wherein print job queue 10 includes a plurality of integer print jobs 71, a plurality of image print jobs 72, and a plurality of predetermined job combinations 90. As seen in FIG. 6, integer print jobs 71 is comprised of many jobs identified as either type "a", "b", "c" or "d". Similarly, image print jobs 72 is comprised of many jobs identified as either type "o" or "p". Accordingly, each job of the same type consists of the same, or substantially similar, function and therefore contains the same, or substantially similar, instructions. Within the integer print jobs 71 there are twelve integer print jobs and within image print jobs 72 there are fourteen image print jobs. An end-of-page identifier "x" marks the end of the print jobs for a given document page.

Job combinations 90 is comprised of a plurality of predetermined job combinations wherein each job combination contains a set identifier 81 and instruction fields IF1 to IF4, 92 to 95. A code representing a job type is provided in each of instruction fields IF1 to IF4. Preferably, each job combination contains a set of job types that have the same, or a substantially equal, number of instructions so that all computing functional units (SIMDs and INTs) complete execution of their respective instructions in the VLIW sequence at the same, or substantially the same, time. For example, for the job combinations identified by sets 0 and 1, each contains one job of integer print jobs 71 for each INT processor in instruction fields IF3 and IF4, and one job of image print jobs 72 for each SIMD in instruction fields IF1 and IF2.

If there are substantially more image print jobs than integer print jobs for a given document page, it is preferable to process the image print jobs in a low resolution mode in order to avoid wasted machine cycles in the INT processors while waiting for the SIMD processors to finish. Accordingly, for the job combinations identified by sets 0− and 1−, each contains one job of integer print jobs 71 for each NT in instruction fields IF3 and IF4, and one job of image print jobs 72 for each SIMD in instruction fields IF1 and IF2. If there are no image print jobs and only integer print jobs for a given document page, it is preferable to utilize the SIMD processors to execute some of the integer print jobs in order to avoid wasted machine cycles in the SIMD processors. Accordingly, the job combination identified by set 2 contains one job of integer print jobs 71 for each INT in instruction fields IF3 and IF4 and for each SIMD in instruction fields IF1 and IF2.

In this manner, task manager 21 uses job combinations 90 to determine which next set of print jobs to select from print job queue 10 for generation of a next VLIW sequence for execution by VLIW computing functional units 30. In particular, task manager 21 accesses print job queue 10 and identifies the remaining print jobs for a given document page to be executed and their respective job types. Task manager 21 determines if there is an image print job among the remaining print jobs for the document page, and, if so, whether there are more remaining image print jobs than integer print jobs. Task manager 21 then reviews job combinations 90 and determines a best job combination to use next based on the identified remaining job types, the balance between the image print jobs and the integer print jobs, and a predetermined rule set.

Preferably, the rule set includes based on the following order of priorities: (1) select a job combination with an integer print job code in each instruction field (both SIMDs and INTs) when there are no image print jobs; (2) if there is at least one image print job but the number of image print jobs is not greater than the number of integer print jobs, then select a job combination having an integer print job code for each INT instruction field and an image print job code for each SIMD instruction field; and (3) if the number of image print jobs is greater than the number of integer print jobs, then select a job combination having an integer print job code for each INT instruction field and two image print job codes for each SIMD instruction field, wherein each image print job code corresponds to a low-resolution version of the image print job.

Task manager 21 then selects a print job from print job queue 10 which corresponds to each print job code in the selected predetermined job combination. If an image print job code corresponds to a low-resolution version of an image print job, then the low-resolution version is used instead of the normal resolution version. Next, task manager 21 generates a VLIW sequence based on the sequential instructions in the selected matching jobs that correspond to the job codes of the selected predetermined job combination. Each instruction field of the VLIWs represents one of the jobs, as discussed above, and also corresponds to one of the computing functional units of VLIW computing functional units 30. The generated VLIW sequence is then executed such that, for each VLIW, each computing functional unit executes the sequential instruction contained in the corresponding instruction field of the VLIW. Task manager 21 then repeats the process to generate a next VLIW sequence for execution until there are no remaining program jobs in print job queue 10.

Figure 7:
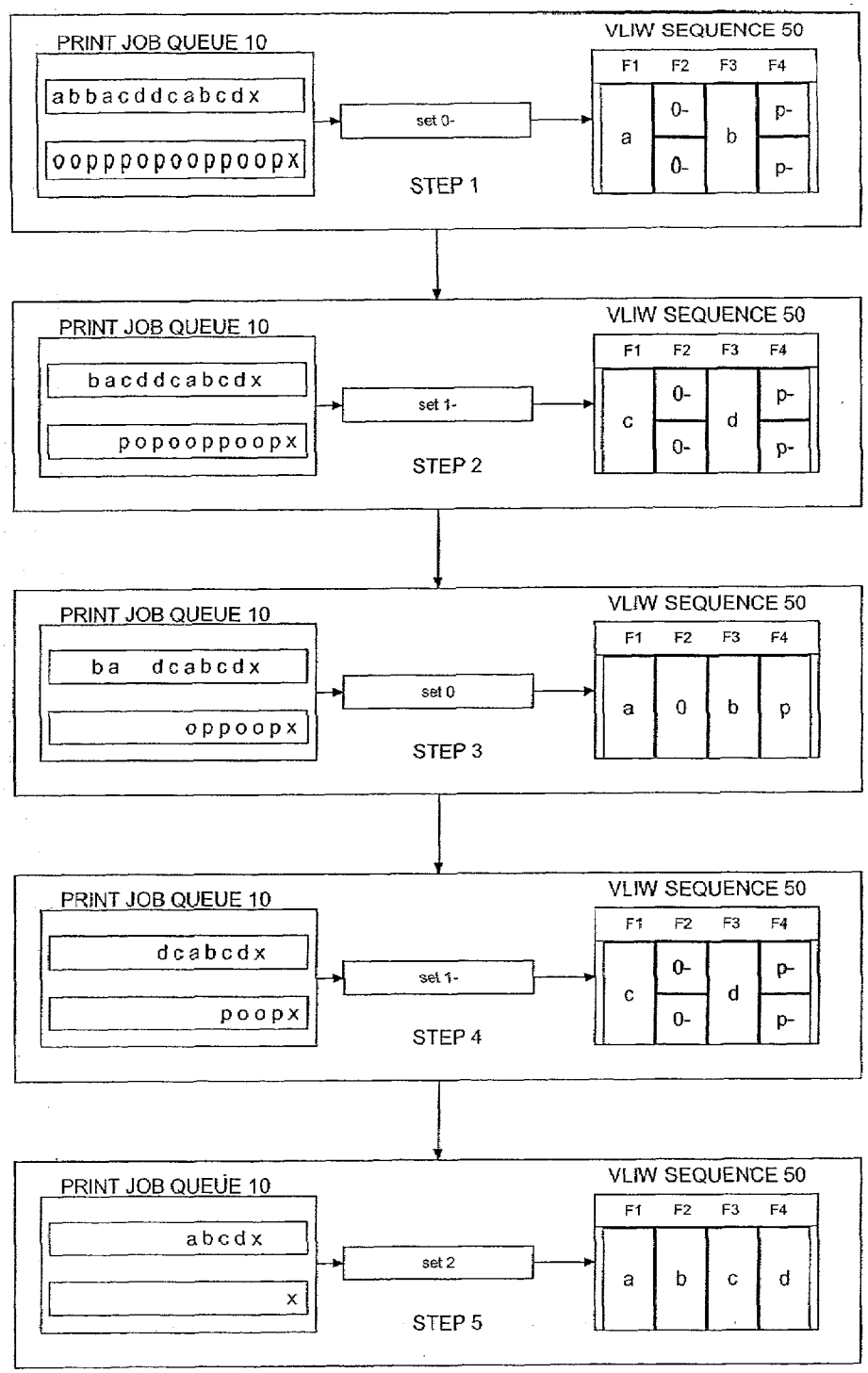
FIG. 7 is a block diagram illustrating the generation of a series of VLIW sequences according to another aspect of the present invention.

FIG. 7 is a block diagram which illustrates the foregoing aspect of the invention in which a series of predetermined job combinations are sequentially selected to generate sequences of VLIWs based on a plurality of program jobs. As seen in FIG. 7, a sequence of five steps are represented to depict the generation of five VLIW sequences based on the instructions in the twenty-six print jobs of print job queue 10 shown in FIG. 6.

In step 1 of FIG. 7, task manager 21 accesses print job queue 10 to identify the remaining types of jobs. Based on the aforementioned rules, task manager 21 selects predetermined job combination set 0–, which is comprised of one type "a" integer print job, one type "b" integer print job, two type "o–" image print jobs, and two type "p–" image print jobs. This is because the number of image print jobs for the document page is greater than the number of integer print jobs. Next, a VLIW sequence is created based on selected jobs which match predetermined job combination set 0–, as depicted in VLIW sequence 50, and the VLIW sequence is then executed.

In step 2 of FIG. 7, task manager 21 accesses print job queue 10 to identify the remaining types of jobs. Based on the aforementioned rules, task manager 21 selects predetermined job combination set 1–, which is comprised of one type "c" integer print job, one type "d" integer print job, two type "o–" image print jobs, and two type "p–" image print jobs. This is because the number of image print jobs for the document page is greater than the number of integer print jobs. Next, a VLIW sequence is created based on selected jobs which match predetermined job combination set 1–, as depicted in VLIW sequence 50, and the VLIW sequence is then executed.

In a similar fashion, VLIW sequences are created and executed in steps three, four and five of FIG. 7 based on selected predetermined job combination sets 0, 1–, and 2, respectively. It should be noted that selected predetermined job combination set 2 was selected in step five because there are only integer print jobs left at that point. Accordingly, the print job codes of selected predetermined job combination set 2 are comprised of an integer print job for each instruction field for both the INT and SIMD processors. It can be seen in FIG. 7 that print job queue 10 is empty after step five such that no more program jobs are available for processing. In this manner, predetermined job combinations are utilized based on the balance of image and integer print jobs in order to efficiently create VLIW sequences in which the instruction fields contain a substantially equal number of instructions from the start to the end of the VLIW sequence. Accordingly, the number of machine cycles for which each computing functional unit has a no-operation instruction is greatly reduced.

Figure 8:
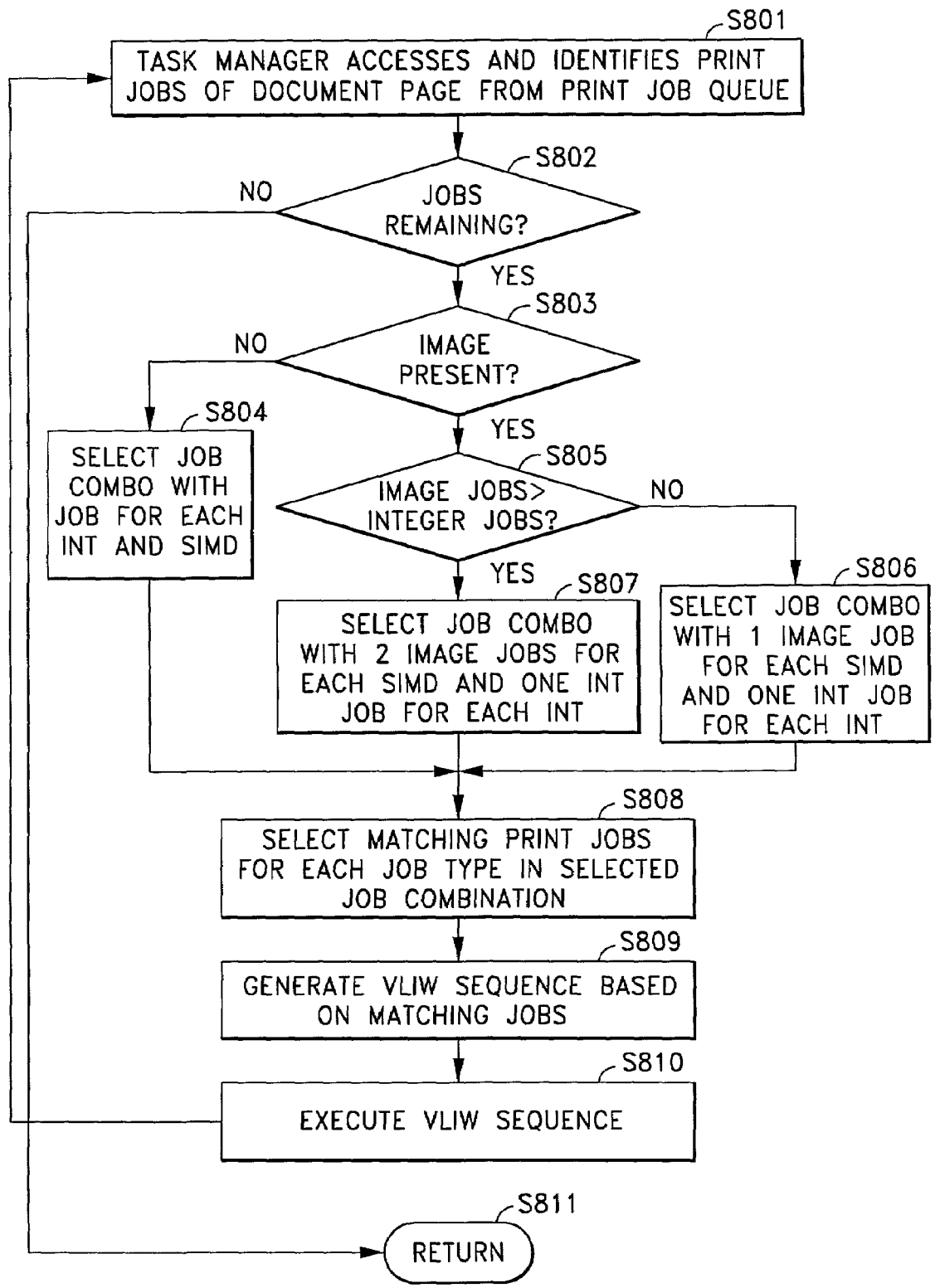
FIG. 8 is a flowchart which illustrates the generation of a series of VLIW sequences according to another aspect of the present invention.

FIG. 8 is a flowchart which explains the aforementioned process for this aspect of the invention. AS seen in step S801, task manager 21 accesses print job queue 10 and identifies the remaining jobs, both integer and image print jobs, to be executed and their respective job types. In step S802, it is determined if there are any jobs remaining in print job queue 10. If not, flow passes to return in step S811. If there are remaining unexecuted jobs remaining, flow passes to step S803 in which it is determined whether there is an image print job in the print jobs for the current document page. If not, a job combination is selected in step S804 in which one integer print job is represented for each instruction field, including both INT and SIMD processors. If not, flow passes to step S805.

In step S805, it is determined whether the number of remaining image print jobs is substantially greater than the number of remaining integer print jobs for the document page being processed. If so, flow passes to step S807 in which a job combination is selected that has one integer print job for each INT instruction field and that has two image print jobs for each SIMD instruction field, wherein each image print job is a low-resolution version of the image print job. If the number of remaining image print jobs is not substantially greater than the number of remaining integer print jobs, flow passes to step S806. In step S806, a job combination is selected that has one integer print job for each INT instruction field and that has one normal resolution image print job for each SIMD instruction field.

As seen in FIG. 8, flow can reach step S808 from any of steps S804, S806 or S807. In step S808, task manager 21 selects a print job from print job queue 10 which corresponds to each job code in the selected predetermined job combination. As mentioned above, if a low resolution version of an image print job is indicated in the job combination, then a low resolution version of the image print job is substituted for the normal resolution version of the image print job. Next, in step S809, task manager 21 generates a VLIW sequence based on the sequential instructions in the selected jobs that correspond to the job codes of the selected job combination. Each instruction field of the VLIWs represents an instruction from the jobs assigned to that computing functional unit (SIMD or INT) of VLIW computing functional units 30. The generated VLIW sequence is then executed such that, for each VLIW, each computing functional unit executes the sequential instruction contained in the corresponding instruction field of the VLIW (step S810). Flow then passes to step S801 and the process is repeated. If it is determined in step S802 that there are no more jobs remaining in print job queue 10, then flow passes to return in step S811.

Based on the above discussion and accompanying figures, it can be appreciated that the present invention provides management and control of print data processing in a computing architecture to complete a plurality of jobs in a job queue by efficiently using the computing resources in the image processing computing architecture. Specifically, the resolution mode of each of the print jobs that comprise a document to be printed is automatically selected based on whether or not the print job contains an image and on the job balance between the image print jobs and the integer print jobs. The invention also provides control in an image processing VLIW architecture to utilize unused image processors for executing integer print jobs, so as to reduce the overall processing time of the image processing system, such as a printer rasterization engine. Also, the invention provides for the use of predetermined VLIW job code sets to implement the aforementioned print job balancing and assignment in a VLIW architecture.

The invention has been described with particular illustrative embodiments. It is to be understood that the invention is not limited to the above-described embodiments and that various changes and modifications may be made by those of ordinary skill in the art without departing from the spirit and scope of the invention.

What is claimed is:

1. A method for executing a plurality of print jobs in a job queue by a computing architecture comprising a plurality of processors, wherein each print job includes at least one instruction for processing print data, wherein each processor represents a plurality of time slots, and wherein each time slot represents a scheduled execution of one of the print jobs or represents an unused time slot, said method comprising:

an access step of accessing one of the print jobs from the job queue;

an image determination step of determining whether the accessed print job represents an image;

a high resolution selection step of selecting a high resolution mode in the case that the accessed print job represents an image;

a low resolution selection step of selecting a low resolution mode in the case that the accessed print job does not represent an image;

an execution step of executing the accessed print job in accordance with the selected resolution mode; and a detection step of detecting whether one of the plurality of processors has an unused time slot in which the execution of a print job is not scheduled, wherein, in said high resolution selection step, the high resolution mode is selected if the accessed print job represents an image and the detection step detects that one of the processors has an unused time slot, and wherein in said low resolution step, the low resolution mode is selected either if the accessed print job does not represent an image or if the detection step detects that none of the processors has the unused time slot.

2. A method according to claim 1, wherein the image is larger than a predetermined size.

3. A method according to claim 1, wherein the image is a high resolution image.

4. A method according to claim 1, wherein the job queue represents a document.

5. A method according to claim 1, wherein each print job represents a page of a document.

6. A method according to claim 1, wherein, in said access step, the accessed print job is a next sequential print job in the job queue.

7. A method according to claim 1, wherein, in said execution step, a high resolution version of the accessed print job is executed in the case that the high resolution mode is selected, and a low resolution version of the accessed print job is executed in the case that the low resolution mode is selected.

8. A method according to claim 1, wherein the computing architecture is comprised of a single processor.

9. A method according to claim 1, wherein the plurality of processors includes an equal number of integer processors and image processors, and the plurality of print jobs includes a number of integer print jobs and a number of image print jobs.

10. A method according to claim 9, wherein the detected one of the processors having an unused time slot is an image processor.

11. A method according to claim 9, wherein, in said high resolution selection step, the high resolution mode is only selected in the case that the accessed print job represents an image and the number of integer print jobs is substantially greater than the number of image print jobs, and wherein in said low resolution selection step, the low resolution mode is selected in the case that the accessed print job does not represent an image or in the case that the number of image print jobs is substantially greater than the number of integer print jobs.

12. A method according to claim 11, further comprising:

a normal resolution selection step of selecting a normal resolution mode in the case that the accessed print job represents an image and the number of integer print jobs is substantially the same as the number of image print jobs.

13. A method according to claim 9, wherein the image processors are SIMD processors.

14. A method for executing a plurality of print jobs in a job queue by a computing architecture having a plurality of processors including a number of image processors and a number of integer processors, said method comprising:

determining whether the remaining print jobs in the job queue include an image print job;

selecting a print job combination from a plurality of predetermined print job combinations, each predetermined print job combination containing a plurality of job codes, each job code representing one of the print jobs in the job queue for execution in one of the plurality of processors; and executing, in each respectively corresponding processor, the print jobs represented by the job codes in the selected print job combination, wherein, in the case that the remaining print jobs include an image print job, the selected print job combination includes one job code for each image processor representing an image print job, and one job code for each integer processor representing an integer print job, and wherein, in the case that the remaining print jobs do not include an image print job, the selected print job combination includes one job code for each integer processor and for each image processor representing an integer print job.

15. A method according to claim 14, wherein the number of image processors is equal to the number of integer processors.

16. A method according to claim 14, further including the step of determining whether the job queue includes a number of remaining image print jobs that is substantially greater than a number of remaining integer print jobs, and wherein, in the case that the number of remaining image print jobs is substantially greater than the number of remaining integer print jobs, the job codes in the selected print job combination include two job codes for each image processor and one job code for each integer processor, each of the two job codes for each image processor representing a low resolution version of one of the remaining image print jobs in the job queue.

17. A method according to claim 16, wherein the low resolution version of the image print job executes in substantially one-half the time in which a normal resolution version of the same image print job executes.

18. A method according to claim 16, wherein the number of image processors is equal to the number of integer processors.

19. A method for executing a plurality of print jobs in a job queue by a computing architecture having a plurality of processors including a number of image processors and a number of integer processors, said method comprising:

determining whether the remaining print jobs in the job queue include at least one remaining image print job, and whether a number of remaining image print jobs is substantially greater than a number of remaining integer print jobs;

selecting a print job combination from a plurality of predetermined print job combinations, each predetermined print job combination containing a plurality of job codes, each job code representing one of the print jobs in the job queue for execution in one of the plurality of processors; and executing, in each respectively corresponding processor, the print jobs represented by the job codes in the selected print job combination, wherein, in the case that the remaining print jobs include at least one remaining image print job and the number of remaining image print jobs is not substantially greater than the number of remaining integer print jobs, the selected print job combination includes one job code for each image processor representing an image print job, and one job code for each integer processor representing an integer print job, wherein, in the case that the remaining print jobs include a number of remaining image print jobs that is substantially greater than the number of remaining integer print jobs, the job codes in the selected print job combination include two job codes for each image processor and one job code for each integer processor, each of the two job codes for each image processor representing a low resolution version of one of the remaining image print jobs in the job queue, and wherein, in the case that the remaining print jobs do not include an image print job, the selected print job combination includes one job code for each integer processor and for each image processor representing an integer print job.

* * * * *